(12) United States Patent
Traubenberg et al.

(10) Patent No.: US 8,679,416 B2
(45) Date of Patent: Mar. 25, 2014

(54) FLUID TREATMENT SYSTEM

(75) Inventors: George Traubenberg, London (CA); Douglas Penhale, London (CA); Li-Zheng Ma, London (CA)

(73) Assignee: Trojan Technologies (CA)

( * ) Notice: Subject to any disclaimer, the term of this patent is extended or adjusted under 35 U.S.C. 154(b) by 1190 days.

(21) Appl. No.: 11/840,590

(22) Filed: Aug. 17, 2007

(65) Prior Publication Data
US 2008/0044320 A1 Feb. 21, 2008

Related U.S. Application Data

(60) Provisional application No. 60/838,189, filed on Aug. 17, 2006.

(51) Int. Cl.
*B01J 19/08* (2006.01)

(52) U.S. Cl.
USPC .......... 422/186; 422/186.3; 422/24; 250/431; 250/432 R; 250/436; 250/438

(58) Field of Classification Search
USPC ............. 422/186, 186.3, 24; 250/431, 432 R, 250/436, 438
See application file for complete search history.

(56) References Cited

U.S. PATENT DOCUMENTS

| | | |
|---|---|---|
| 5,006,244 A | 4/1991 | Maarschalkerweerd |
| 5,539,210 A | 7/1996 | Maarschalkerweerd |
| 5,590,390 A | 12/1996 | Maarschalkerweerd |
| 5,937,266 A | 8/1999 | Kadoya |

(Continued)

FOREIGN PATENT DOCUMENTS

| | | |
|---|---|---|
| CN | 1966415 A | 5/2007 |
| EP | 0 317 735 A2 | 9/1988 |

(Continued)

OTHER PUBLICATIONS

The first Office Action from the State Intellectual Property Office of the People's Republic of China for Chinese Patent Application No. 20078003118.7, with a mailing date of Nov. 12, 2010.

(Continued)

*Primary Examiner* — Xiuyu Tai
(74) *Attorney, Agent, or Firm* — Katten Muchin Rosenman LLP

(57) ABSTRACT

There is described a fluid treatment system. The fluid treatment system comprises: an open channel for receiving a flow of fluid and a fluid treatment zone. The fluid treatment zone comprising a plurality of elongate radiation source assemblies orientated such that: (i) a longitudinal axis of each radiation source assembly is transverse to a direction of fluid flow through the fluid treatment zone, and (ii) an end of each radiation source assembly is disposed above a predetermined maximum height of fluid flow in the open channel. A first baffle plate is disposed upstream of the fluid treatment zone. The first baffle plate is positioned such that a distal end thereof is below the predetermined maximum height of fluid flow in the open channel. In a preferred embodiment, the present fluid treatment system provides for an area in which a cleaning system for the radiation source assemblies can be "parked" when not in use. In the so-called "parked" position, the cleaning system may be readily accessed for servicing and the like without affecting the flow of fluid through the fluid treatment zone and a fluid treatment system. This is as significant advantage of the fluid treatment system.

24 Claims, 9 Drawing Sheets

Baffled Surface

(56) References Cited

U.S. PATENT DOCUMENTS

| | | |
|---|---|---|
| 5,952,663 A | 9/1999 | Blatchley, III et al. |
| RE36,896 E | 10/2000 | Maarschalkerweerd |
| 6,264,888 B1 | 7/2001 | Palestro et al. |
| 6,342,188 B1 | 1/2002 | Pearcey et al. |
| 6,500,346 B1 | 12/2002 | Taghipour et al. |
| 6,576,189 B1 | 6/2003 | Wedekamp |
| 6,872,954 B2 * | 3/2005 | Ueberall .................. 250/431 |
| 6,956,220 B2 | 10/2005 | Traubenberg et al. |
| 7,091,495 B2 | 8/2006 | Panico et al. |
| 7,217,933 B2 | 5/2007 | Gadgil et al. |
| 2002/0113021 A1 * | 8/2002 | Traubenberg et al. ........ 210/748 |
| 2004/0118786 A1 * | 6/2004 | Fraser et al. .................. 210/748 |
| 2005/0092932 A1 | 5/2005 | Bircher et al. |
| 2007/0114442 A1 | 5/2007 | Chen et al. |

FOREIGN PATENT DOCUMENTS

| | | |
|---|---|---|
| FR | 2 768 718 A1 | 3/1999 |
| JP | 08-57477 A | 3/1996 |
| JP | 2001-25765 A | 1/2001 |
| WO | 99/14161 A1 | 3/1999 |

OTHER PUBLICATIONS

Office Action from the Canadian Intellectual Property Office for Canadian Patent Application No. 2,660,719.

Supplementary European Search Report for European Patent Application No. 07785059.2, with a mailing date of Oct. 22, 2002.

Office Action from the European Patent Office for European Patent Application No. 07785059.2, with a mailing date of Nov. 19, 2010.

Australian Office Action dated Mar. 23, 2011.

* cited by examiner

Free Surface – Common Enclosure

Baffled Surface

Baffled Surface with Wipers

Baffled Surface with Ballasts

Baffled Surface with Dip Sensor

Baffled Surface with Dip Sensor relocated

FLUID TREATMENT SYSTEM

CROSS-REFERENCE TO RELATED APPLICATION

The present application claims the benefit under 35 U.S.C. §119(e) of provisional patent application Ser. No. 60/838,189, filed Aug. 17, 2006, the contents of which are hereby incorporated by reference.

BACKGROUND OF THE INVENTION

1. Field of the Invention

In one of its aspects, the present invention relates to a fluid treatment system, more particularly, an ultraviolet radiation water treatment system. In another of its aspects, the present invention relates to a method for treating a fluid, more particularly a method for irradiating water.

2. Description of the Prior Art

Fluid treatment systems are generally known in the art. More particularly, ultraviolet (UV) radiation fluid treatment systems are generally known in the art. Early treatment systems comprised a fully enclosed chamber design containing one or more radiation (preferably UV) lamps. Certain problems existed with these earlier designs. These problems were manifested particularly when applied to large open flow treatment systems which are typical of larger scale municipal waste water or potable water treatment plants. Thus, these types of reactors had associated with them the following problems:

relatively high capital cost of reactor;
difficult accessibility to submerged reactor and/or wetted equipment (lamps, sleeve cleaners, etc);
difficulties associated with removal of fouling materials from fluid treatment equipment;
relatively low fluid disinfection efficiency, and/or
full redundancy of equipment was required for maintenance of wetted components (sleeves, lamps and the like).

The shortcomings in conventional closed reactors led to the development of the so-called "open channel" reactors.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 patents) all describe gravity fed fluid treatment systems which employ ultraviolet (UV) radiation.

Such systems include an array of UV lamp modules (e.g., frames) which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the flow rate of the fluid past the lamps. Typically, one or more UV sensors may be employed to monitor the UV output of the lamps and the fluid level is typically controlled, to some extent, downstream of the treatment device by means of level gates or the like.

The Maarschalkerweerd #1 patents teach fluid treatment systems which were characterized by improved ability to extract the equipment from a wetted or submerged state without the need for full equipment redundancy. These designs compartmentalized the lamp arrays into rows and/or columns and were characterized by having the top of the reactor open to provide free-surface flow of fluid in a "top open" channel.

The fluid treatment system taught in the Maarschalkerweerd #1 patents is characterized by having a free-surface flow of fluid (typically the top fluid surface was not purposely controlled or constrained). Thus, the systems would typically follow the behaviour of open channel hydraulics. Since the design of the system inherently comprised a free-surface flow of fluid, there were constraints on the maximum flow each lamp or lamp array could handle before either one or other hydraulically adjoined arrays would be adversely affected by changes in water elevation. At higher flows or significant changes in the flow, the unrestrained or free-surface flow of fluid would be allowed to change the treatment volume and cross-sectional shape of the fluid flow, thereby rendering the reactor relatively ineffective. Provided that the power to each lamp in the array was relatively low, the subsequent fluid flow per lamp would be relatively low. The concept of a fully open channel fluid treatment system would suffice in these lower lamp power and subsequently lower hydraulically loaded treatment systems. The problem here was that, with less powerful lamps, a relatively large number of lamps was required to treat the same volume of fluid flow. Thus, the inherent cost of the system would be unduly large and/or not competitive with the additional features of automatic lamp sleeve cleaning and large fluid volume treatment systems.

This led to the so-called "semi-enclosed" fluid treatment systems.

U.S. Pat. Nos. 5,418,370, 5,539,210 and Re 36,896 (all in the name of Maarschalkerweerd and all assigned to the assignee of the present invention and hereinafter referred to as the Maarschalkerweerd #2 patents) all describe an improved radiation source module for use in gravity fed fluid treatment systems which employ UV radiation. Generally, the improved radiation source module comprises a radiation source assembly (typically comprising a radiation source and a protective (e.g., quartz) sleeve) sealingly cantilevered from a support member. The support member may further comprise appropriate means to secure the radiation source module in the gravity fed fluid treatment system.

Thus, in order to address the problem of having a large number of lamps and the incremental high cost of cleaning associated with each lamp, higher output lamps were applied for UV fluid treatment. The result was that the number of lamps and subsequent length of each lamp was dramatically reduced. This led to commercial affordability of automatic lamp sleeve cleaning equipment, reduced space requirements for the treatment system and other benefits. In order to use the more powerful lamps (e.g. medium pressure UV lamps), the hydraulic loading per lamp during use of the system would be increased to an extent that the treatment volume/cross-sectional area of the fluid in the reactor would significantly change if the reactor surface was not confined on all surfaces, and hence such a system would be rendered relatively ineffective. Thus, the Maarschalkerweerd #2 patents are characterized by having a closed surface confining the fluid being treated in the treatment area of the reactor. This closed treatment system had open ends which, in effect, were disposed in an open channel. The submerged or wetted equipment (UV lamps, cleaners and the like) could be extracted using pivoted hinges, sliders and various other devices allowing removal of equipment from the semi-enclosed reactor to the free surfaces.

The fluid treatment system described in the Maarschalkerweerd #2 patents was typically characterized by relatively short length lamps which were cantilevered to a substantially vertical support arm (i.e., the lamps were supported at one end only). This allowed for pivoting or other extraction of the lamp from the semi-enclosed reactor. These significantly shorter and more powerful lamps inherently are characterized by being less efficient in converting electrical energy to UV energy. The cost associated with the equipment necessary to physically access and support these lamps was significant.

Practical implementation of known fluid treatment systems of the type described above have been such that the longitudinal axis of the radiation source is: (i) parallel to the direction of fluid flow through the fluid treatment system, or (ii) orthogonal to the direction of fluid flow through the fluid treatment system. Further, in arrangement (ii), it has been common to place the lamps in an array such that, from an upstream end to a downstream end of the fluid treatment system, a downstream radiation source is placed directly behind an upstream radiation source.

U.S. Pat. No. 5,952,663 [Blatchley, III et al. (Blatchley)] teaches an apparatus for applying ultraviolet radiation dosage to fluids in an open channel. With particular reference to FIG. 12 in Blatchley, there is shown a fluid treatment channel containing a module having a series of vertically disposed lamps (14). Disposed on the sidewalls of the fluid channel are a series of fluid diverters (27). As shown, the arrangement of fluid diverters (27) is such that each fluid diverter (27) projects to the fluid treatment channel to the same extent.

As will be described in more detail hereinbelow, one of the problems with an arrangement of vertically disposed lamps (14) such as that shown in Blatchley is that the unconfined surface of the flow of fluid will be at a different level from an upstream to a downstream direction in the array of lamps (14). This leads to one of two problems: (i) water near the top of the lamps does not receive full radiation exposure; or (ii) some of the lamps (14) will be partially exposed to atmosphere disposing in wasted radiation.

Thus, despite the advances made in the art described above, there is still room for improvement. Specifically, it is desirable to have a fluid treatment system utilizing arrangement (ii) described above which obviates or mitigates the occurrence of either of the two problems discussed herein with respect to the Blatchley system. Additionally, it would be highly advantageous to have a fluid treatment system adopting arrangement (ii) which allowed for convenient storage of a cleaning system for the radiation source assemblies, together with ready access of that system and other dependent and independent systems (e.g., ballasts, radiation sensors, fluid level systems and the like) for servicing and related needs without affecting the flow of fluid through and/or treatment thereof in the fluid treatment system.

SUMMARY OF THE INVENTION

It is an object of the present invention to obviate or mitigate at least one of the above-mentioned disadvantages of the prior art.

It is another object of the present invention to provide a novel fluid treatment system that obviates or mitigates at least one of the above-mentioned disadvantages of the prior art.

Accordingly, in one of its aspects, the present invention provides a fluid treatment system comprising:

an open channel for receiving a flow of fluid;

a fluid treatment zone comprising a plurality of elongate radiation source assemblies orientated such that: (i) a longitudinal axis of each radiation source assembly is transverse to a direction of fluid flow through the fluid treatment zone, and (ii) an end of each radiation source assembly is disposed above a predetermined maximum height of fluid flow in the open channel;

a first baffle plate disposed upstream of the fluid treatment zone;

wherein the first baffle plate is positioned such that a distal end thereof is below the predetermined maximum height of fluid flow in the open channel.

Thus, the present inventors have discovered a fluid treatment system which utilizes vertically disposed baffle plates that are placed upstream and downstream of an array of vertically-disposed radiation source assemblies. The provision of such an arrangement of baffle plates and vertically-disposed radiation source assemblies in an open channel results in the provision of a fluid level which is below the maximum predetermined fluid level upstream of the fluid treatment zone and, in a preferred embodiment, above the fluid level downstream of the fluid treatment zone. This "intermediate" fluid level typically contains a portion of fluid between the baffled plates that does not get exposed to radiation and is relatively stagnate—i.e., this portion of the fluid is less dynamic than the remainder of the fluid passing through the fluid treatment zone.

In addition, the provision of the baffle plates in the present fluid treatment system provides for an area in which a cleaning system for the radiation source assemblies can be "parked" when not in use. In the so-called "parked" position, the cleaning system may be readily accessed for servicing and the like without affecting the flow of fluid through the fluid treatment zone and a fluid treatment system. This is as significant advantage of the fluid treatment system.

In a preferred embodiment of the present fluid treatment system, a ballast (or other control system) is disposed in the area used to "park" the cleaning system. More preferably, the ballast (or other control system) is configured so as to be at least partly submersible in the fluid thereby facilitating cooling of the ballast (or other control system) and allowing it to operate at optimal efficiency and permitting ease of running diagnostics. As will be described further with reference to the illustrated embodiments, it is particularly preferred to nest the ballast (or other control system) within an arrangement or array of radiation source assemblies so as to provide for a compact arrangement of the major components of the fluid treatment system. In addition, such an arrangement facilitates access to the ballast (or other control system) for servicing and the like.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Prior to describing the preferred embodiments of the present invention, we will describe a prior art fluid treatment system such as the one taught in Blatchley described above.

Figure 1:
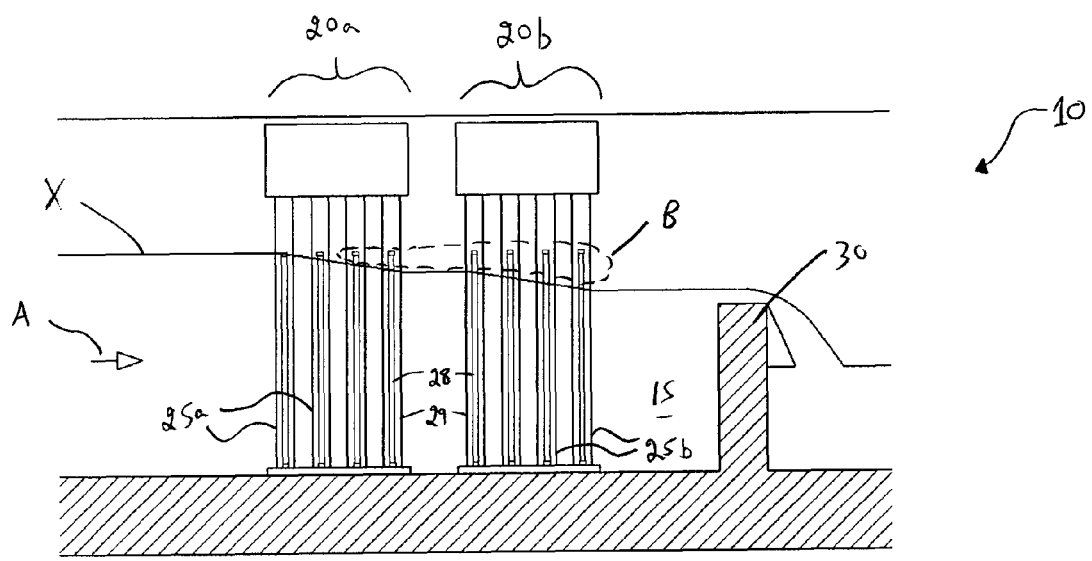
FIG. 1 illustrates a schematic side view of a fluid treatment system similar to the one taught by Blatchley referred to above.

Thus, with reference to FIG. 1, there is illustrated a fluid treatment system 10 comprising an open channel 15 through which a flow of fluid is travelling in the direction of arrow A.

Disposed in open channel 15 are two arrays 20a,20b of radiation source assemblies. It will be seen that array 20a comprises radiation source assemblies 25a and array 20b comprises radiation source assemblies 25b. It will be further seen that radiation source assemblies 25a,25b are disposed vertically in open channel 15 such that one end of each radiation source assembly 25a,25b emanates from the flow of fluid.

Each radiation source assembly 25a,25b comprises a radiation source 28 disposed in a radiation transparent protective sleeve 29. In the illustrated embodiment (and for clarity) radiation source 28 has an arc length (i.e., the length over which it emits radiation) equivalent to its overall length.

Disposed downstream of arrays 20a,20b is a control gate 30. Control gate 30 is conventional and serves to control the fluid level upstream therefrom.

As can be seen in FIG. 1, control gate 30 is designed to regulate the fluid level to a maximum height at the upstream-most radiation source assembly 25a of array 20a and the upstream-most radiation source assembly 25b of array 20b. The fluid level is shown schematically at line X in FIG. 1.

Since the water level upstream of the downstream-most radiation source assembly is higher (due to hydraulic head losses resulting from disposition of downstream radiation source assemblies 25a,25b), it must be accepted that, in order to achieve sufficient disinfection of fluid flowing at the higher level, it is necessary to accept wasted radiation from radiation source assemblies 25a,25b located toward the downstream end of arrays 20a,20b—this is indicated generally in region B in FIG. 1.

If control gate 30 were designed to regulate the water level to the height of downstream-most radiation source assembly 25a,25b in array 20a,20b, this will allow untreated water to flow over the top of the ends of the upstream-most radiation source assemblies 25a,25b in array 20a,20b. Such water would not receive full exposure to radiation from each of radiation source assemblies 25a,25b. This situation is generally not acceptable.

Figure 2:
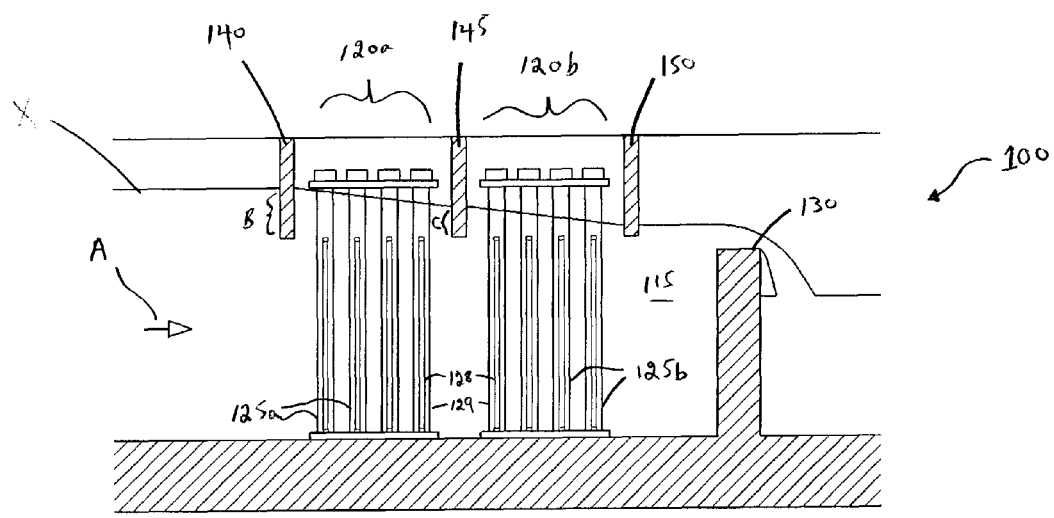
FIGS. 2-6 each illustrate a schematic side view of preferred embodiments in accordance with the present fluid treatment system.

With reference to FIG. 2, there is illustrated a fluid treatment system 100 in accordance with a preferred embodiment of the present invention. For ease of understanding, reference numerals having the same last two digits in FIG. 2 denote like elements shown with the same last two digits in FIG. 1. Thus, control gate 30 in fluid treatment system 10 is equivalent to control gate 130 and fluid treatment 100 shown in FIG. 2, etc.

Fluid treatment system 100 comprises a first array 120a of radiation source assemblies 125a and a second array 120b of radiation source assemblies 125b.

In fluid treatment system 100, a baffle plate is placed on either side of each of arrays 120a and 120b. Thus, a pair of baffle plates 140,145 are placed on either side of the upper portion of array 120a. Further, array 120b is placed downstream of baffle plate 145 and a baffle plate 150 is disposed just downstream of the upper portion of array 120b.

Preferably, baffle plates 140,145,150 span the width of open channel 115. Further, it is preferred to have the distal ends of baffle plates 140,145,150 in substantial alignment with one end of the arc length of radiation source 128 in each of radiation source assemblies 125a,125b.

Preferably, control gate 130 is configured so as to control the height of fluid upstream of baffle plate 140 to a pre-determined maximum level. As shown, the pairs of baffle plates 140,145 and 145,150, in conjunction with radiation source assemblies 125a,125b, respectively, function to lower the fluid level from that level upstream of baffle plate 140 in a manner such that the fluid level downstream of baffle plate 150 is substantially coincident with the distal end of baffle plate 150.

Since it is preferred to have the arc lengths of each radiation source 128 in each of radiation source assemblies 125a,125b in alignment with the distal ends of baffle plates 140,145,150, the fluid that passes the distal ends of baffle plates receives full exposure to radiation.

In the embodiment illustrated in FIG. 2, a region B of fluid between baffle plates 140,145 and a region C of fluid between baffle plates 145,150 remains relatively stagnate. In consequence, it is not critical that fluid in regions B and C does not receive full exposure to radiation since fluid in those regions remains stagnate due to the natural formation of eddies (slow moving). The provision of baffle plates 140,145,150 surprisingly prevents significant exchange of fluid between: (i) the relatively stagnant fluid described above, and (ii) bulk fluid flow that passes near baffle plates 140,145,150.

Figure 3:
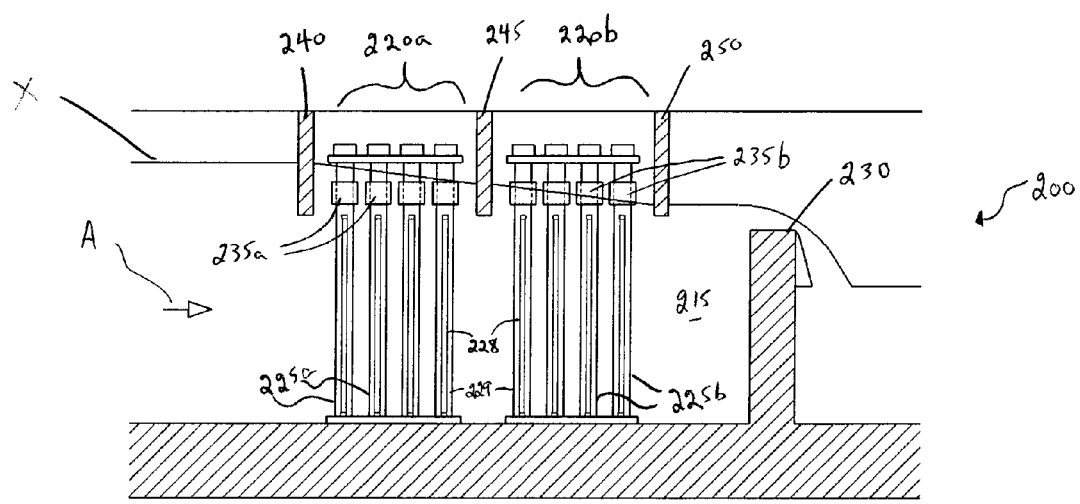

FIGS. 3-6 illustrate modifications to fluid treatment system 100 shown in FIG. 2. Again, for ease of understanding, reference numerals used in FIGS. 3-6 that have the same last two digits as references numerals in FIG. 2 are intended to denote like elements. Thus, control gate 230 in fluid treatment system 200 in FIG. 3 is equivalent to control gate 130 in fluid treatment 100 shown in FIG. 2, etc.

With reference to FIG. 3, the modification is inclusion of a cleaning system for the radiation source assemblies.

More specifically, array 220a includes a cleaning system 235a and array 220b includes a cleaning system 235b, which cleaning system may comprise one or more of a cleaning ring, a cleaning wiper, and/or a mechanical scraping element, or any combination thereof. Preferably, cleaning systems 235a, 235b are of the type taught by one or more of the Maarschalakerweerd #2 patents, U.S. Pat. No. 6,342,188 (which discloses cleaning rings and wipers) and/or U.S. Pat. No. 6,646, 269.

It can also be seen that cleaning systems 235a,235b can be "parked" in a position above the maximum fluid level upstream of baffle plate 240. This facilitates access to cleaning systems 235a,235b for service needs and the like.

Figure 4:
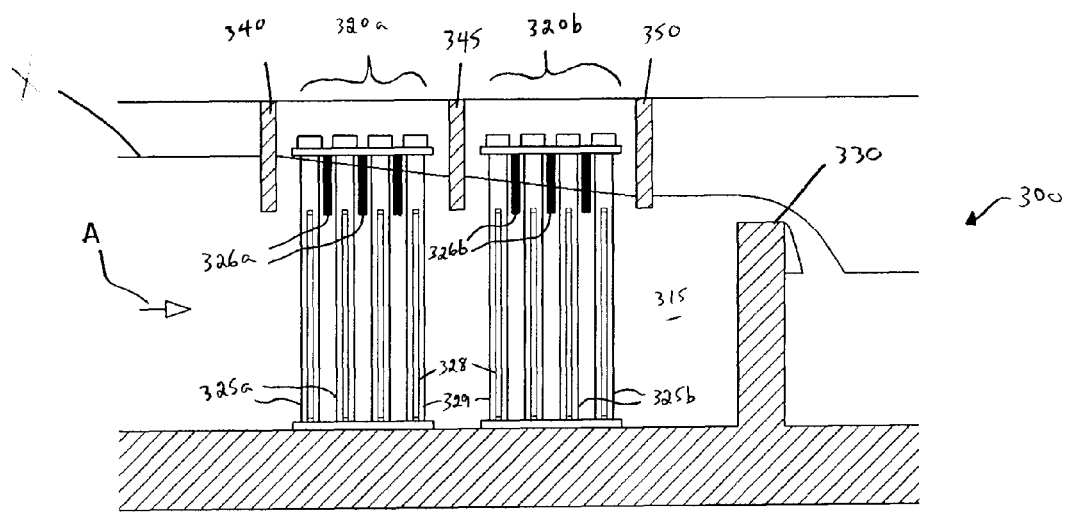

With reference to FIG. 4, the modification relates to inclusion of a ballast (or other control system) for operating the radiation source assemblies in arrays 320a,320b. Thus, fluid treatment system 300, a series of ballasts 326a are used in array 320a and a series of ballasts 326b are used in array 320b.

Figure 5:
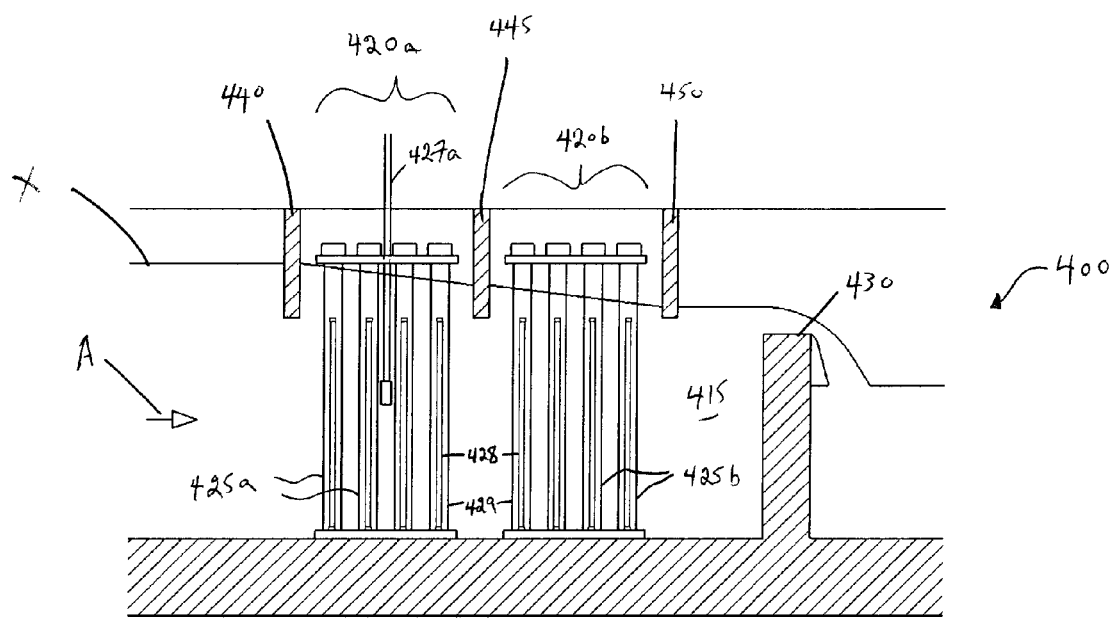

With reference to FIG. 5, the modification relates to inclusion of a radiation sensor system 427a in array 420a.

Figure 6:
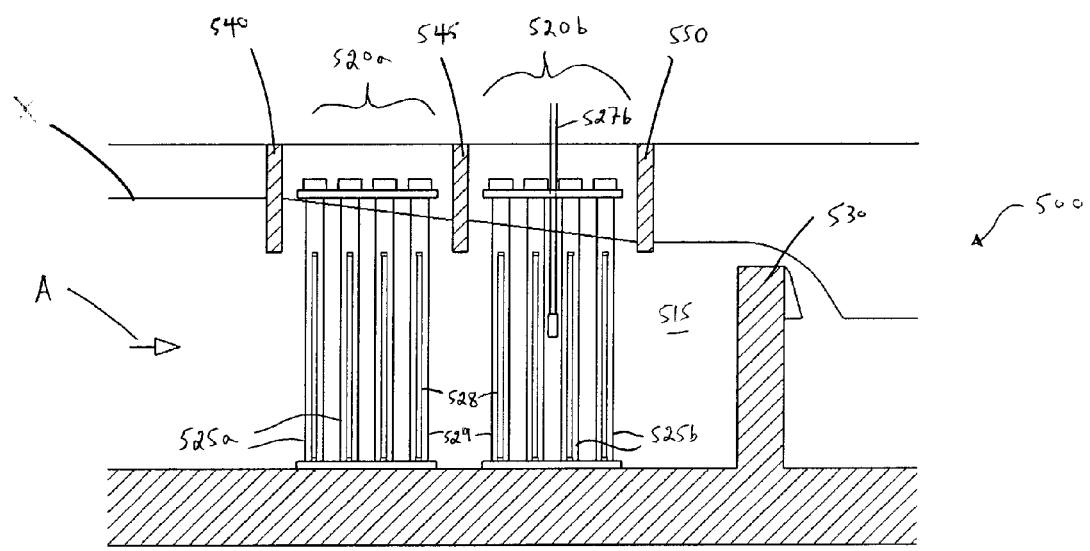

With reference to FIG. 6, the modification relates to the use of a radiation sensor system 527b in array 520b.

Figure 7:
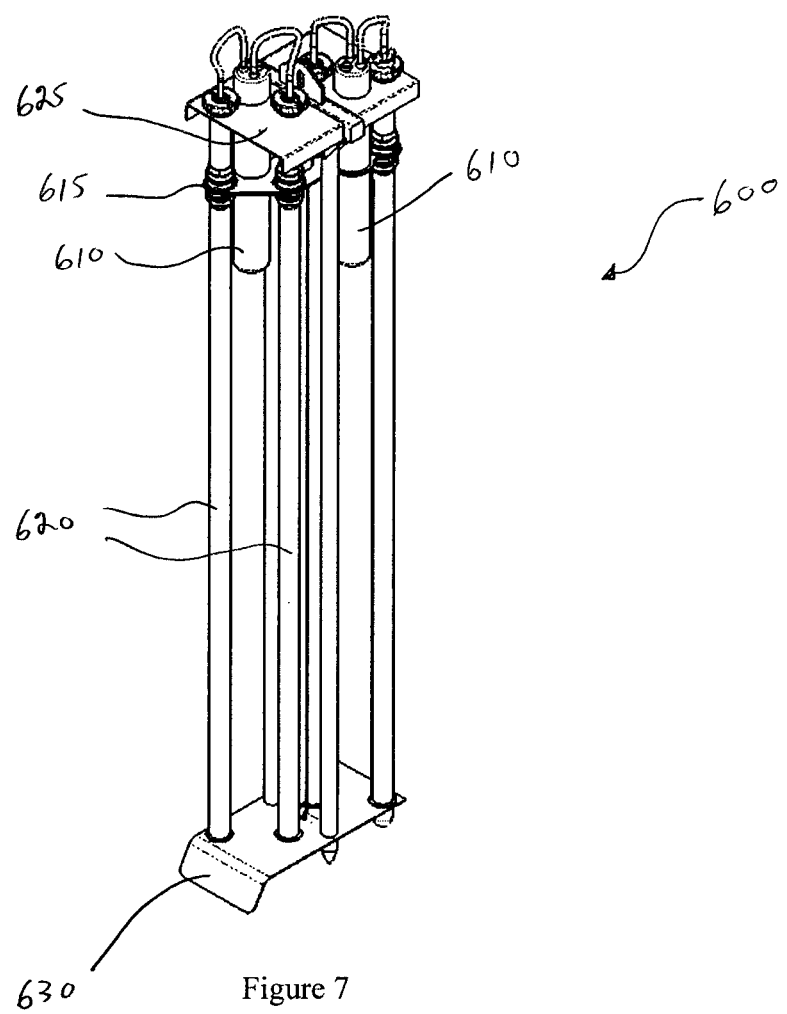
FIGS. 7-8 illustrate preferred embodiments of a radiation source module for use in the present fluid treatment system.

With reference to FIG. 7, there is provided an illustration of a radiation source module 600 which combines the use of a ballast 610 and a cleaning system 615 with a series of radiation source assemblies 620. Radiation source assemblies 620 are supported by opposed support plates 625,630.

Figure 8:
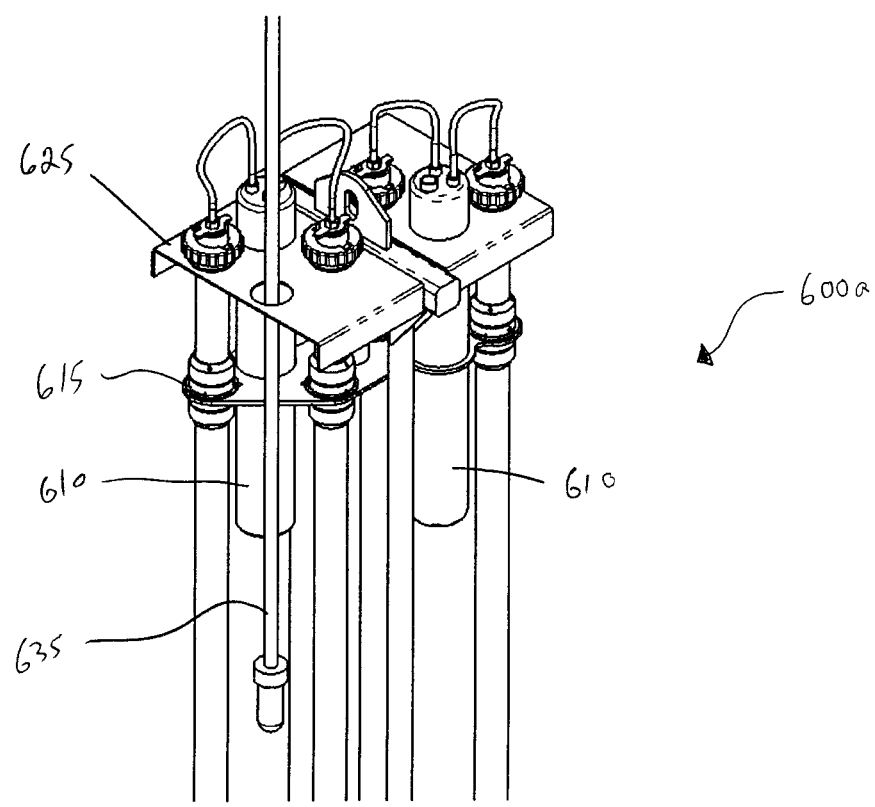

FIG. 8 illustrates an upper portion of a radiation source module 600a that is similar to radiation source module 600 illustrated in FIG. 7. The modification is inclusion of a radiation sensor 635.

Thus, radiation source module 600a combines, in a single module, the functions of a cleaning system, ballast (for controlling the radiation sources) and a radiation sensor.

Figure 9:
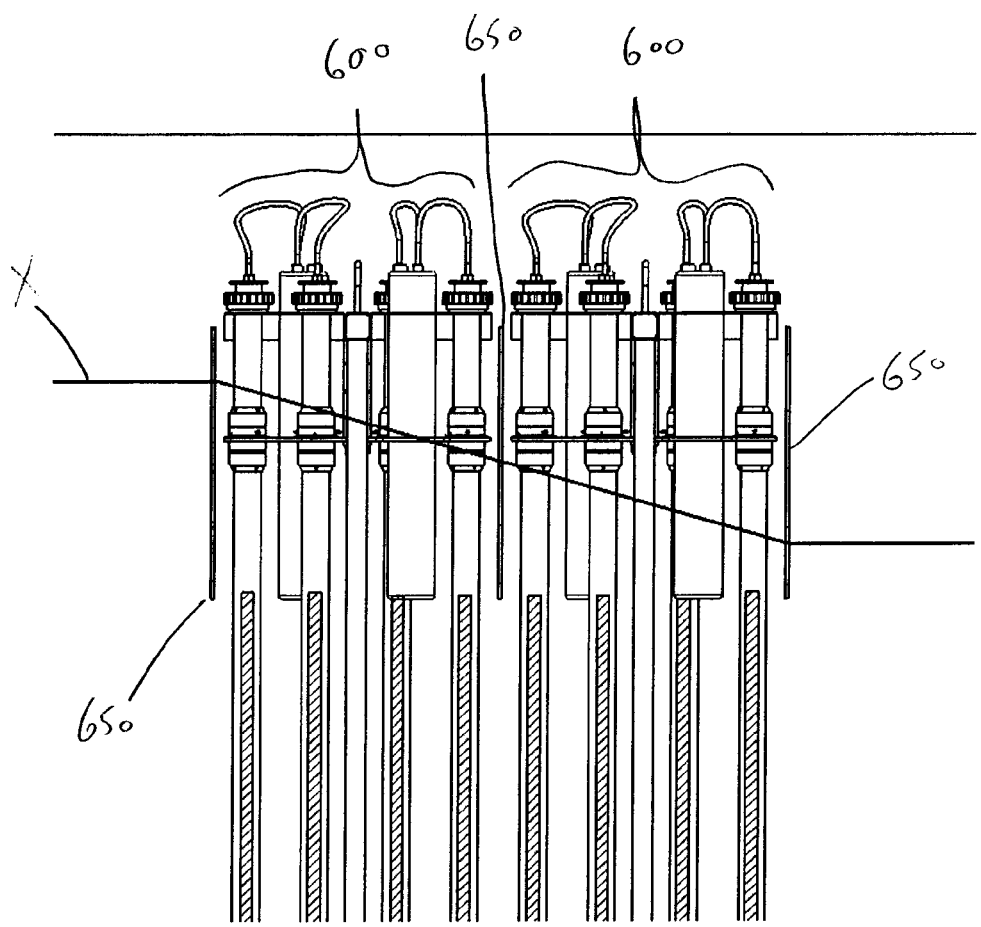
FIG. 9 illustrates an enlarged schematic side view of a further preferred embodiment of a portion of the present fluid treatment system.

FIG. 9 illustrates placement of two modules 600 from FIG. 7 in a fluid treatment system. Each radiation source module 600 is interposed between a pair of baffle plates 650. As clearly shown in FIG. 9, the distal end of the baffle plate 650 extends downward below the tops of the radiation sources, and thus within the arc lengths of the radiation sources.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, while each of the illustrated embodiments include a baffle plate positioned downstream of the downstream-most array of radiation source assemblies, the present invention is intended to cover fluid treatment systems in which such a baffle plate is omitted. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid treatment system comprising:
   an open channel for receiving a flow of fluid, said open channel comprising two sidewalls;
   a fluid treatment zone comprising a plurality of elongate radiation source assemblies orientated such that: (i) a longitudinal axis of each radiation source assembly is transverse to a direction of fluid flow through the fluid treatment zone, and (ii) an end of each radiation source assembly is disposed above a predetermined maximum height of fluid flow in the open channel;
   a first baffle plate disposed upstream of the fluid treatment zone so as to span the open channel from one sidewall to a second sidewall, said first baffle plate being configured to extend downward into the fluid flow;
   wherein the first baffle plate is positioned such that a distal end thereof is in substantial alignment with one end of an arc length of said each radiation source assembly, said first baffle plate distal end having an elongate edge transverse to (i) the longitudinal axis of the open channel and (ii) the longitudinal axes of the radiation source assemblies.

2. The fluid treatment system defined in claim 1, further comprising a second baffle plate disposed downstream of the fluid treatment zone, the second baffle plate being positioned such that a distal end thereof is in substantial alignment with one end of the arc length of said each radiation source assembly.

3. The fluid treatment system defined in claim 2, wherein the second baffle plate spans the open channel from the one sidewall to the second sidewall.

4. The fluid treatment system defined in claim 1, wherein the plurality of elongate radiation source assemblies comprises a series of banks of radiation source assemblies.

5. The fluid treatment system defined in claim 4, further comprising an intermediate baffle plate interposed between an adjacent pair of banks of radiation source assemblies.

6. The fluid treatment system defined in claim 4, further comprising an intermediate baffle plate interposed between each adjacent pair of banks of radiation source assemblies.

7. The fluid treatment system defined in claim 5, wherein the intermediate baffle plate spans the open channel from the one sidewall to the second sidewall.

8. The fluid treatment system defined in claim 4, wherein each bank of radiation source assemblies comprises a cleaning system for removing fouling materials from an exterior surface of the radiation source assemblies in said each bank.

9. The fluid treatment system defined in claim 1, wherein each of the plurality of radiation source assemblies comprises a cleaning system for removing fouling materials from an exterior surface of the each radiation source assembly.

10. The fluid treatment system defined in claim 8, wherein each cleaning system is moveable between: (i) a parked position located between an adjacent pair of baffle plates, and (ii) an extended position located adjacent a distal end of the radiation source assemblies of said each bank.

11. The fluid treatment system defined in claim 9, further comprising a second baffle plate disposed downstream of the fluid treatment zone, and wherein the cleaning system is moveable between: (i) a parked position located between the first baffle plate and the second baffle plate, and (ii) an extended position located adjacent a distal end of the radiation source assemblies.

12. The fluid treatment system defined in claim 8, wherein each cleaning system comprises a cleaning ring coupled to the corresponding radiation source assembly.

13. The fluid treatment system defined in claim 12, wherein the cleaning ring comprises a mechanical scraper element.

14. The fluid treatment system defined in claim 12, wherein the cleaning ring comprises a chamber for receiving a cleaning composition.

15. The fluid treatment system defined in claim 1, wherein each radiation source assembly comprises a radiation source having an arc length comprising a proximal arc end.

16. The fluid treatment system defined in claim 15, further comprising a second baffle plate disposed downstream of the fluid treatment zone, and wherein the distal ends of the first baffle plate and the second baffle plate are in substantial alignment with each other.

17. The fluid treatment system defined in claim 15, wherein the each radiation source is disposed in a protective sleeve.

18. The fluid treatment system defined in claim 17, wherein the protective sleeve comprises a closed end and an open end.

19. The fluid treatment system defined in claim 1, wherein each radiation source assembly comprises an ultraviolet radiation source.

20. The fluid treatment system defined in claim 1, wherein each radiation source assembly comprises a low pressure high output ultraviolet radiation source.

21. The fluid treatment system defined in claim 15, further comprising a second baffle plate disposed downstream of the fluid treatment zone, and wherein the distal ends of the first baffle plate and the second baffle plate extend downward to within the arc length of each radiation source.

22. The fluid treatment system defined in claim 1, wherein said first baffle plate is configured to cause an open channel fluid level in the fluid treatment zone to be below said predetermined maximum height of fluid flow in the open channel upstream of the fluid treatment zone.

23. A fluid treatment system comprising:
    an open channel for receiving a flow of fluid, said open channel comprising two sidewalls;
    a fluid treatment zone comprising a plurality of elongate radiation source assemblies orientated such that: (i) a longitudinal axis of each radiation source assembly is transverse to a direction of fluid flow through the fluid treatment zone, and (ii) an end of each radiation source assembly is disposed above a predetermined maximum height of fluid flow in the open channel, each radiation source assembly comprising at least one radiation source;
    a first baffle plate disposed upstream of the fluid treatment zone so as to span the open channel in a direction from one sidewall to a second sidewall, said first baffle plate being configured to extend downward into the fluid flow, wherein the first baffle plate is positioned such that a distal end thereof is in substantial alignment with one end of an arc length of the each radiation source assembly;

wherein the first baffle plate is positioned such that the distal end thereof extends downward at least to the tops of the radiation sources, but not to the bottom of the open channel.

24. A fluid treatment system comprising:

an open channel for receiving a flow of fluid, said open channel comprising two sidewalls;

a fluid treatment zone comprising a plurality of elongate radiation source assemblies orientated such that: (i) a longitudinal axis of each radiation source assembly is transverse to a direction of fluid flow through the fluid treatment zone, and (ii) an end of each radiation source assembly is disposed above a predetermined maximum height of fluid flow in the open channel, each radiation source assembly comprising at least one radiation source;

a first baffle plate disposed upstream of the fluid treatment zone so as to span the open channel in a direction from one sidewall to a second sidewall, said first baffle plate being configured to extend downward into the fluid flow, wherein the first baffle plate is positioned such that a distal end thereof is in substantial alignment with one end of an arc length of the each radiation source assembly;

wherein the first baffle plate is positioned such that the distal end thereof extends downward into the arc lengths of the radiation sources, but not to the bottom of the open channel.

* * * * *